United States Patent [19]
Wiegand

[11] 3,715,813
[45] Feb. 13, 1973

[54] SHOCK ABSORBER DEMONSTRATION STAND

[75] Inventor: John A. Wiegand, Northbrook, Ill.

[73] Assignee: Maremont Corporation, Chicago, Ill.

[22] Filed: Oct. 4, 1971

[21] Appl. No.: 186,200

[52] U.S. Cl. ................................................... 35/49
[51] Int. Cl. ........................................... G09b 25/00
[58] Field of Search ................................... 35/49, 50

[56] References Cited

UNITED STATES PATENTS 3,478,445   11/1969   McAfee ................................. 35/49

*Primary Examiner*—Harland S. Skogquist
*Attorney*—Cushman, Darby & Cushman

[57] ABSTRACT

The disclosure embraces a shock absorber demonstration stand having a base and a post extending generally perpendicularly from the base; a lever arm is pivotally attached intermediate its ends to the post adjacent its upper end and a shock absorber has one end mounted on the base and its other end connected to the lever arm on one side of the post; a tension spring is connected at one end to the lever arm on the side of the post opposite the shock absorber and the other end of the tension spring is connected to the post.

4 Claims, 2 Drawing Figures

INVENTOR
JOHN A. WIEGAND
BY Cushman, Darby & Cushman
ATTORNEYS

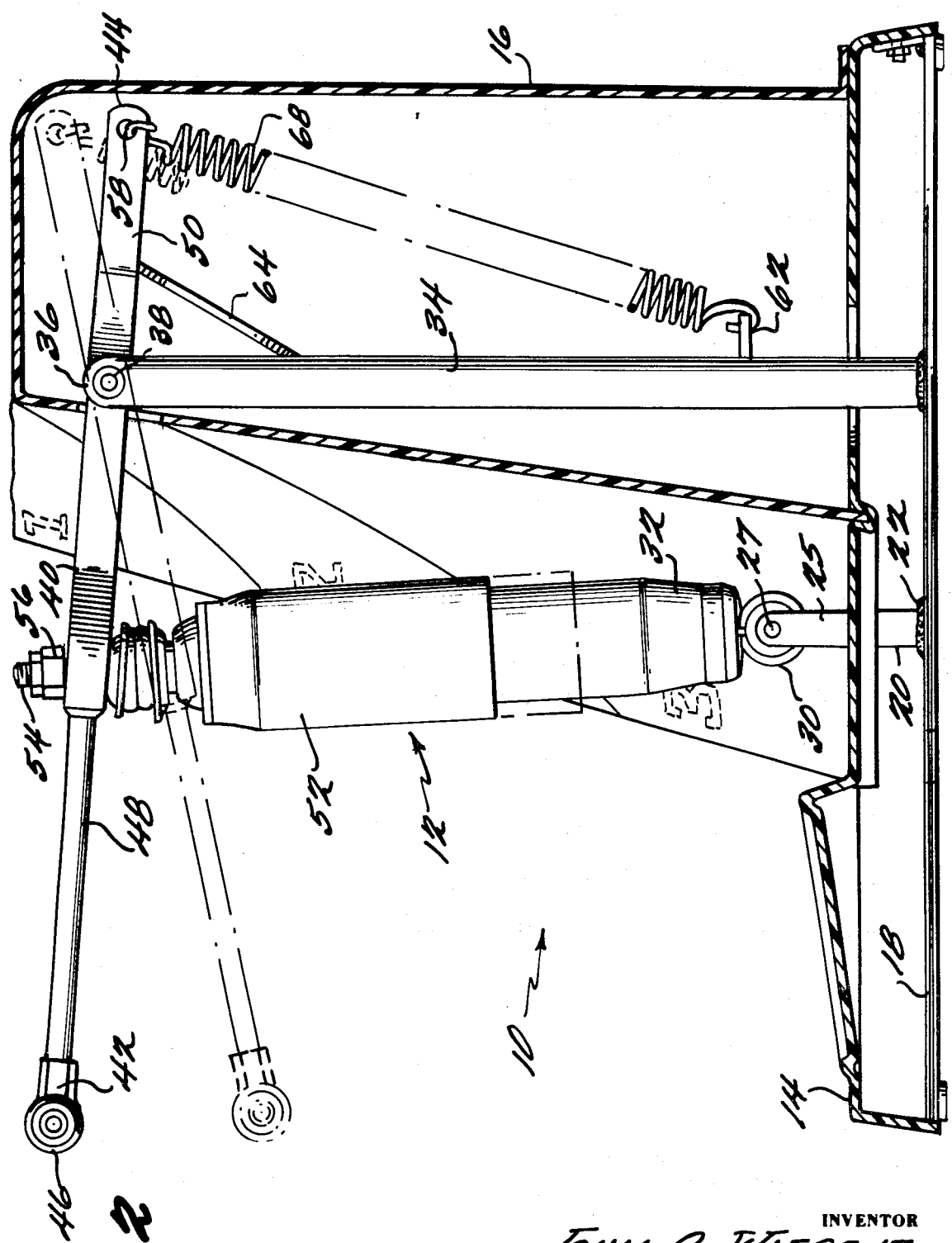

SHOCK ABSORBER DEMONSTRATION STAND

BACKGROUND OF THE INVENTION

This invention relates to demonstration stands for vehicular shock absorbers which enables an individual operating the stand to visually observe the damping characteristics of a shock absorber. More specifically, the demonstration stand of the present invention will enable the user of the device to actuate a shock absorber in a manner analogous to its actual operation and to experience the differences in damping characteristics of a shock absorber unit of a type having adjustable control means for regulating the flow of hydraulic fluid through the control valve of the unit.

Generally, shock absorbers are provided in vehicles to cushion or damp the relative motion between the vehicle body and the vehicle running gear. Direct, double acting, hydraulic shock absorbers when mounted on vehicles usually have their opposite ends connected respectively between the frame and axle of the vehicle. Such shock absorbers most commonly consist of a cylinder in which is slidably located a piston having a piston rod connected thereto which extends outwardly through one end of the cylinder. In practice, the piston rod is connected to the vehicle body and the end of the cylinder opposite the end through which the piston rod extends is connected to the vehicle running gear. When the vehicle's springs are compressed, as occurs when the wheels of the vehicle strike a road-way elevation, the pistons of the shock absorbers move in their compression stroke, that is, downwardly in the cylinders of the shock absorbers. When the vehicle's springs expand, the pistons of the shock absorbers move in their rebound stroke, that is, upwardly in the cylinders. Valve means are usually provided in the pistons of such shock absorbers to control the flow of hydraulic fluid through or around the pistons from one side thereof to the other during the compression and rebound strokes. Frequently, the valve means of these shock absorbers are spring-loaded and unseat only after a predetermined pressure builds up in the working cylinder which overcomes the spring load.

Manufacturers of automotive shock absorbers have recently developed and placed on the market shock absorber units provided with means for accurately adjusting the operation of the valve means so that the damping characteristics of an individual shock absorber can be varied so as to be able to accomodate a broad range of road-way conditions.

It is important and desirable, therefore, from the point of view of driving safety and proper vehicle maintenance that a dealer in automotive shock absorbers have available a demonstration stand which will enable a prospective purchaser to quickly and easily adjust such a damping unit to each of its different positions and to operate the shock absorber when in each position so as to be able to experience the difference in damping characteristics corresponding to each adjusted position.

Shock absorber demonstration stands of the prior art such as that disclosed in the U.S. Pat. to McAfee, U.S. Pat. No. 3,478,445 of Nov. 18, 1969 have generally been characterized by the provision of a spring biased lever arm to which one end of a shock absorber is fixed. The other end of the shock absorber is attached to a stationary portion of the stand. These devices are operable to compress a compression spring and shock absorber and are so arranged so as to permit the shock absorber to extend under the influence of the spring upon release of the lever arm. Such devices, however, have not afforded a user of such stands ready access to the shock absorber itself, particularly where it is desired to enclose the demonstration stand in a casing so as to render the stand more presentable in appearance as, for example, when the stand is intended to be displayed in a showroom. Moreover, the stands of the prior art have been characterized by a relatively bulky appearance so that a relatively large amount of floor space has been required when it was desired to exhibit them.

The present invention provides in a preferred embodiment a shock absorber demonstration stand that is substantially more compact than those of the prior and which affords ready access to the shock absorber unit itself thus rendering it relatively simple for a user of the device to adjust a shock absorber of a type having a plurality of possible adjusted positions.

Briefly, the stand of the present invention consists of a base frame to which is attached an upright post. The lever arm is pivotally attached intermediate its ends to the upper end of the post so that the lever arm has one portion extending to one side of the post and another portion extending to the other side of the post. On one side of the post a shock absorber is attached at one end to the lever arm and at its other end to the base. A tension spring is connected between the other portion of the lever arm and the post.

From the foregoing it can be appreciated that the demonstration stand of this invention can be manufactured so as to occupy substantially less space than the stands of the prior art and in addition, can be manufactured at less cost since fewer elements are required.

BRIEF DESCRIPTION OF THE DRAWINGS

FIG. 2 is a side view in elevation and partly in section of the demonstration stand of FIG. 1.

DETAILED DESCRIPTION OF THE INVENTION

Figure 1:
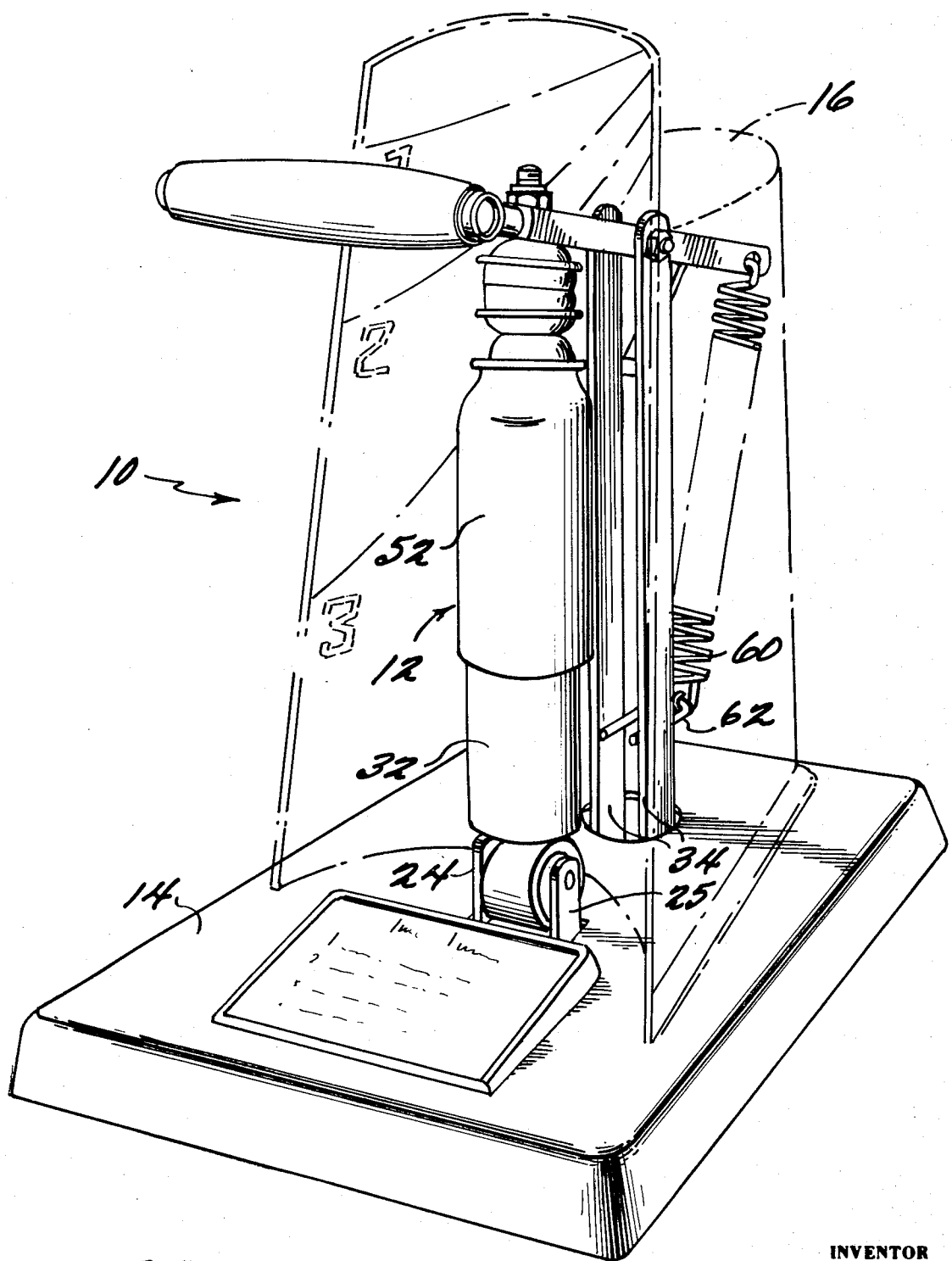
FIG. 1 is a view in perspective of the shock absorber demonstration stand of the present invention.

Referring now to the drawings, there is shown in FIG. 1 an embodiment of the shock absorber demonstration stand of this invention, generally indicated at 10, which is adapted to demonstrate the cooperation of a doubleacting telescoping, barrel-type shock absorber 12. The base of the stand may be provided with a cover 14 to which may be secured a housing indicated by the phantom lines at 16 which encloses the rear portion of a lever arm and post which supports the lever arm. Suitable explanatory material may be carried on the front of housing 16 or on the base 14 to explain the operation of shock absorbers as well as the function of the demonstration stand 10.

The demonstration stand 10 is particularly adapted to demonstrate the operation of a shock absorber of a type that is adjustable so as to vary the damping characteristics such as that disclosed in the U.S. Pat. No. 2,788,092 to R. H. Whistler, Jr., granted Apr. 9, 1957 and assigned to same assignee as the present invention. In the Whistler patent there is disclosed a direct, double-acting hydraulic shock absorber having means for adjusting the spring load on the recoil or rebound valve which is carried in the piston and which are actuated simply by collapsing the shock absorber and rotating one part thereof relative to the other through a predetermined distance whereby the damping characteristics of the shock absorber are altered. as by welding at 22 so that the arms 24 and 25 of the bracket 20 will extend generally perpendicularly from the base 18. A pin 27 extends between the arms 24 and 25 and supports the mounting ring 30 which is securely attached to the lower end of the lower barrel member 32 of the shock absorber 12.

A bifurcated post 34 is also welded to base 18 to extend generally perpendicularly therefrom. Post 34 may consist simply of flat bar stock that is bent in the form of a U with the connecting portion of the U welded to base 18. At the upper end 36 of post 34 there is provided pivot means in the form of a pin 38 which is secured to extend generally horizontally through apertures in the upper end 36 of post 34.

Pin 38 extends through an aperture formed in a lever arm 40 so that the lever arm 40 will be pivotally mounted intermediate its ends 42 and 44 on post 34. End 42 of lever arm 40 may be provided with a handle 46. With lever arm 40 pivotally mounted intermediate its ends, one portion 48 of the lever arm will extend to one side of the pin 38 and another portion 50 will extend to the other side thereof.

The upper barrel portion 52 of shock absorber 12 is provided with a bolt 54 and which is rigidly secured thereto. Bolt 54 is inserted through an aperture in portion 48 of lever arm 40 and a lock nut 56 is threaded onto bolt 54 to maintain the bolt in the aperture in lever arm 40.

End 44 of portion 50 of the lever arm is provided with an aperture 58 in which is mounted one end of a tension coil spring 60. The other end of the spring 60 is hooked on a bracket 62 which preferably is secured to post 34 by any suitable means such as by welding and disposed as is more clearly shown in FIG. 1. Coil spring 60, as noted above, is a tension spring so that a constant torque will be exerted on the lever arm 40 to pivot the lever arm clockwise as viewed in FIG. 2 to thus maintain the shock absorber 12 in an extended position as shown in solid lines. To limit the clockwise motion of lever arm 40, a stop member 64 may be secured between the arms of post 34 to abut the underside of portion 50 of lever arm 40 as illustrated in FIG. 2.

To operate the demonstration stand 10, an individual need merely grasp the handle 46 of lever arm 40 and move it downwardly as far as possible, or for, example to the dotted line position illustrated in FIG. 2, which will result in movement of portion 52 of shock absorber 12 downwardly onto portion 32 of the shock absorber 12 and will also result in the extension of tension spring 60. Upon release of the handle 46 tension spring 60 will exert a clockwise rotating torque on lever arm 40 which will be transmitted to the shock absorber 12 through nut 56 and bolt 54. When the shock absorber 12 is of the type that is capable of adjustment to vary its damping characteristics, such as the damping unit disclosed in the aforementioned patent to Whistler, a user of the demonstration stand 10 will be able to easily adjust the shock absorber 12 to each of its possible adjustable positions by depressing handle 46 and then grasping portion 52 of the damping unit 12 to rotate it to relative to portion 32. Upon release of handle 46, tension spring 60 will exert a clockwise rotating torque on lever arm 40 to result in the extension of damping unit 12, that is to say, portion 52 will move away from portion 32 and an individual will be able to visually detect the differences in the rate of such movements for each of the adjusted positions of the shock absorber 12.

What is claimed is:

1. A demonstration stand for a shock damping unit of the type having at least two members each having an end, said members being mounted for relative movement towards each other corresponding to a compression stroke of said unit and away from each other corresponding to a rebound stroke of said unit, said stand comprising a base, a post connected to and extending from said base, a lever arm having spaced apart ends, pivot means pivotally mounting said lever arm intermediate its ends on said post at a point spaced generally perpendicularly from said base so that said lever arm has one portion located to one side of said pivot means and another portion located on the other side thereof and so that said lever arm is movable between deactuated and actuated positions with said one portion movable in one direction toward or away from said base and said other portion being movable in an opposite direction relative to said base, said one portion of said lever arm having means for mounting a said end of one of said members of a shock damping unit and said base having means associated spacially with said mounting means of said one portion for mounting the said end of the other of said members, tension spring means acting between said post and said another portion of said lever arm to constantly urge said lever arm toward said deactuated position so that, when said one portion of said lever arm is moved toward said base to move said members of a damping unit through said compression stroke and released, said members will be moved through said rebound stroke to thereby exhibit the damping action of said unit by resisting movement of said lever arm by said tension spring means.

2. The demonstration stand as claimed in claim 1 wherein an abutment is secured to said post to limit movement of said another portion of said lever arm towards said base.

3. The demonstration stand as claimed in claim 1 wherein a handle is attached to said end of said one portion of said lever arm.

4. The demonstration stand as claimed in claim 1 wherein said tension spring means is connected to said another portion of said lever arm adjacent said end thereof.

* * * * *